April 15, 1952
W. SULLIVAN
2,592,759
ADAPTER FOR USE WHEN FILLING THE TUBES
OF VEHICLE TIRES WITH LIQUID
Filed Aug. 18, 1948
2 SHEETS—SHEET 1
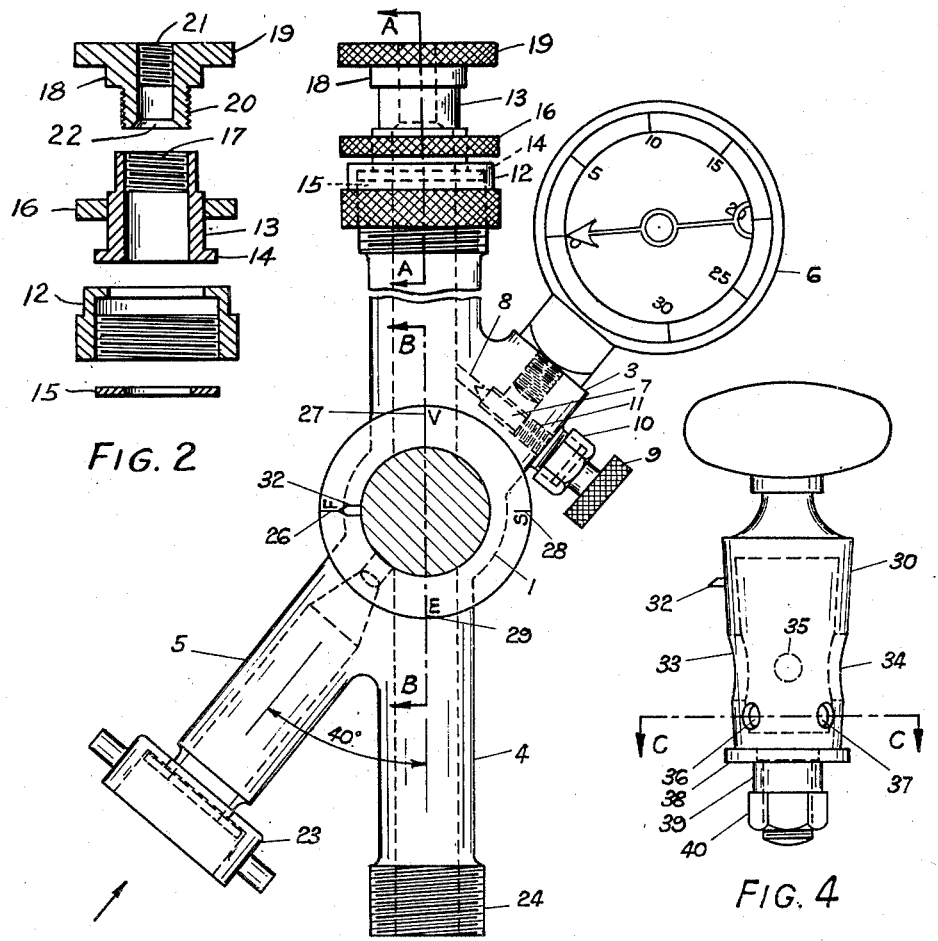
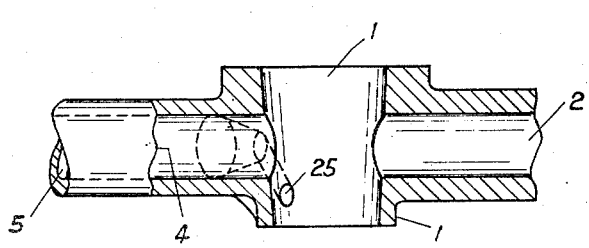
INVENTOR
WILLIAM SULLIVAN
BY Young, Emery & Thompson
Attys.

April 15, 1952

W. SULLIVAN 2,592,759

ADAPTER FOR USE WHEN FILLING THE TUBES
OF VEHICLE TIRES WITH LIQUID

Filed Aug. 18, 1948

INVENTOR
WILLIAM SULLIVAN
BY Young, Emery & Thompson Attys

Patented Apr. 15, 1952

2,592,759

UNITED STATES PATENT OFFICE 2,592,759

ADAPTER FOR USE WHEN FILLING THE TUBES OF VEHICLE TIRES WITH LIQUID

William Sullivan, Bishop Park, Toowoomba, Australia

Application August 18, 1948, Serial No. 44,944
In Australia September 1, 1947

4 Claims. (Cl. 226—20.8)

When the tube within the tire on a tractor wheel, and/or the like is to be filled, or partially filled with liquid (usually water) the tube is evacuated and consequently collapsed before any water is allowed in. After the tube has been filled with water in the conventional manner a certain volume of air is usually trapped between the tube and tire. This air works away during the use of the wheel and it is necessary in a comparatively short time to "top off" the water in the tube, or pump sufficient air into the tube to ensure the true shape of the tube and tire. Also conventional methods for filling tubes with one hundred per cent liquid are tedious operations and necessitate an attendant standing by during the filling operations.

The object of this invention is to provide an improved adaptor, for use when filling the tubes of vehicle tires with liquid, characterized in that it is simple in operation, compact, adaptable for use with various types of valves, eliminates the need for complete evacuation of the tube and registers the pressure in the tube. A further object of the invention is to provide an adaptor which can be connected to any water pressure supply for example town supply, gravity feed, or water supplied from a rotary, semi-rotary or plunger pump. Another object is to provide an adaptor which may be safely set in operation and left unattended whilst the tube is being completely filled with water, after which the desired pressure may be obtained in a few moments.

The nature of the invention will be fully understood from the following description taken in connection with the accompanying drawings wherein:

Figure 1 is an elevation of the adaptor, with the top of the plug cock cut away for clarity;

Figure 2 is an exploded sectional elevation on the line A—A of Figure 1;

Figure 3 is a fragmentary section on the line B—B of Figure 1 with the plug cock omitted;

Figure 4 is an elevation of the plug cock;

Figure 5 is a section on the line C—C of Figure 4;

Figure 6:
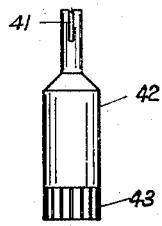
Figure 6 is an elevation of the tube valve core extractor.

Referring to Figures 1 to 5, a plug cock body 1 has four short pipes 2, 3, 4 and 5, cast integral with it or affixed as by welding or brazing thereto. Pipes 2 and 4 are in line, and located at an angle of approximately 40° to the line of pipes 3 and 5. A pressure gauge 6 is fitted to the end of pipe 3 and a needle valve 7 controls the opening in the passage 8 between pipes 2 and 3. Needle valve 7 has a knurled head 9, the stem of needle valve 7 passing through a gland nut 10, and screwing into pipe 3 at 11. The end of pipe 2 is threaded to take socket 12 which holds connection 13 by its flange 14 against rubber washer 15 and the end of pipe 2. Connection 13 has a knurled finger grip 16 which is affixed thereto after flange 14 has been located inside socket 12. The other end of connection 13 is internally threaded at 17 to suit the thread on the larger types of conventional tube valve stems. 18 is a connection for use on the smaller types of tube valve stems and has a knurled finger grip 19, a male threaded end 20 adapted to fit in the screwed end 17 of connection 13, and an internally partially threaded passage 21 adapted to fit onto said smaller tube valve stems. At its unthreaded end passage 21 is countersunk at 22 to facilitate the insertion of a tube valve.

The end of pipe 5 is provided with a conventional ring 23 for connection to a water pressure supply line (not shown). The end of pipe 4 is externally threaded at 24 to receive the ring of the valve assembly extractor or the bleeder pipe. Pipe 5 opens into the cock body 1 via inclined passage 25 whose end is below the openings of pipes 2 and 4 (see Figure 3). On the face of body 1 engraved marks 26, 27, 28 and 29 indicate the positions of plug cock 30 relative to body 1. A pointer 32 on plug cock 30 rotates over the engraved face of body 1. Plug cock 30 is hollow (see Figure 4) and has ports 33, 34, 35, 36 and 37 disposed as shown in the drawings. Positions of ports 33, 34 and 35 are indicated by their centre lines in Figure 5. Washers 38 and 39 and nut 40 hold cock 30 in position in body 1 in the usual manner.

Figure 7:
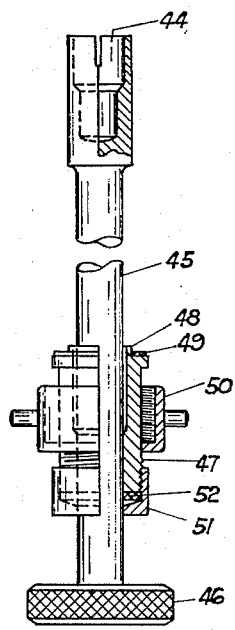
Figure 7 is a half-sectional elevation of the tube valve assembly extractor.

Referring to Figures 6 and 7, 41 is a slot in the reduced end of the solid tube valve core extractor 42 adapted to fit around said valve core and hold it during turning. The other end 43 of said extractor 42 is knurled or ridged and is a push fit into split socket 44 at the inner end of the spindle 45 of the tube valve assembly extractor. 46 is a knurled knob affixed to said spindle 45 which is carried in bush 47. Bush 47 has a spigot 48 with washer 49 adapted to be held against end 24 of pipe 4 (see Figure 1) by ring 50. Gland nut 51 with packing 52 ensures an air and water-tight seal for brush 47 around spindle 45. Said socket 44 is adapted to also grip the locking ring of a conventional double or two piece tube valve assembly as fitted to the later types of tractor wheel tubes.

Figure 8:
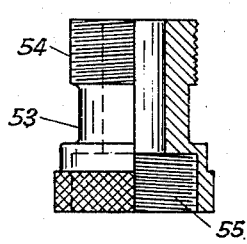
Figure 8 is a half-sectional elevation of an extension piece for use with the adaptor on wheels with deep recesses at the valves.

The assembly shown in Figure 1 is adapted for use on wheels where the access to the tube valve stem is easy. On some types of wheels the tube valve stem extends into a recess in the wheel rim and as shown in Figure 1 gauge 6 would foul the rim. Referring to Figure 8 an extension piece 53 has male and female threaded ends 54 and 55 adapted respectively to screw into socket 12 and onto the screwed end of pipe 2, thus lengthening pipe 2 and enabling the apparatus to be connected to the tube valve stem by either of threads 17 or 21 depending on the type of valve stem.

Figure 9:
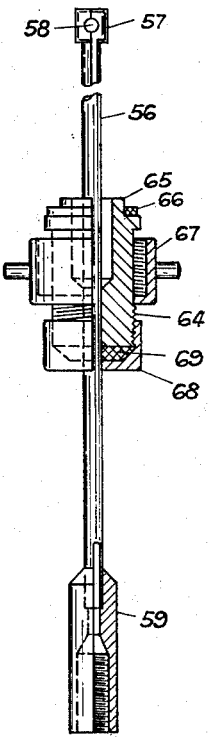
Figure 9 is a half-sectional elevation of the bleeder pipe assembly for use in association with the adaptor.
Figure 11:
Figures 10 and 11 are side elevation and end elevation of the needle valve spindle of the bleeder pipe assembly.
Figure 10:
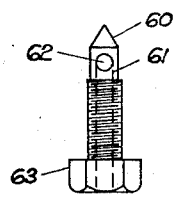

Referring to Figures 9, 10 and 11, a bleeder tube 56 (preferably two millimetre hypodermic needle tubing), has an enlarged inner end 57, provided with holes 58 and a needle valve body 59 at its other end. The needle valve 60 has a central hole 61, opening into a diametric hole 62 near the point of the needle, and is provided with a hexagon or knurled head 63 for adjustment purposes. A bush 64 around tube 56 has a spigot 65 with washer 66 adapted to be held against end 24 of pipe 4 (see Figure 1) by ring 67. Gland nut 68 with packing 69 ensures an air and water-tight seal for bush 64 around tube 56.

Figure 14:
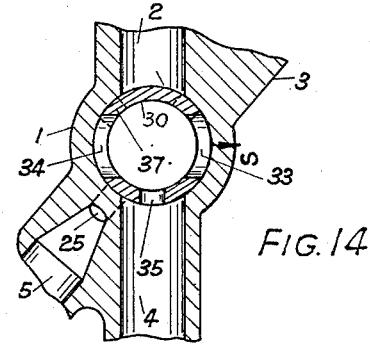
Figure 15:
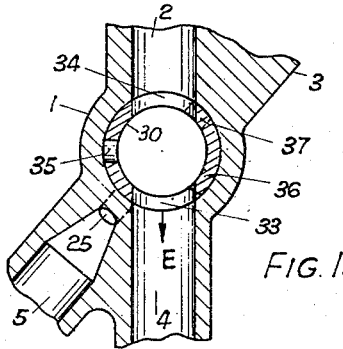

When a tractor wheel tube is to be filled with water, the wheel is brought to rest with the tube valve stem in its highest position. The adaptor (Figure 1) is secured to the tube valve stem by connection 13 or 18 depending on whether the tube valve is of the conventional double or single valve type. The pointer 32 on cock 30 is turned to mark 28 (see Figures 1 and 14) which indicates shut position. Ring 23 is connected to a water supply and the water turned on. The valve assembly extractor (see Figure 7) is connected to pipe 4, valve extractor 42 is in socket 44 when connection 18 is being used, and is omitted when connection 13 alone is being used. Cock 30 is turned to bring pointer 32 over mark 29 (see Figures 1 and 15), socket 44 is pushed through ports 33 and 34 in cock 30 and the tube valve is unscrewed from the tube valve stem and withdrawn into pipe 4. Cock 30 is turned back to bring pointer 32 over mark 28 (see Figures 1 and 14) and the valve assembly extractor with the tube valve is disconnected from pipe 4.

Figure 12:
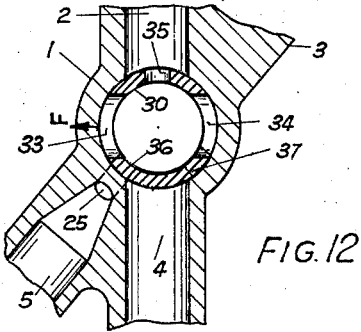
Figures 12 to 15 are fragmentary sections on the centre line of the adaptor showing the relative positions of the plug cock and adaptor body.

Needle valve 7 is opened and gauge 6 registers the air pressure inside the tube. Cock 30 is turned to bring pointer 32 over mark 29 (see Figures 1 and 15) and air is allowed to escape from the tube until approximately a pressure of three to five pounds per square inch remains in the tube. This pressure is sufficient to prevent the tube from collapsing or leaving the wall of the tire. Cock 30 is now turned to bring pointer 32 over mark 26 (see Figures 1 and 12) and water is admitted to the tube via passage 25, ports 36 and 35 and pipe 2.

Figure 13:
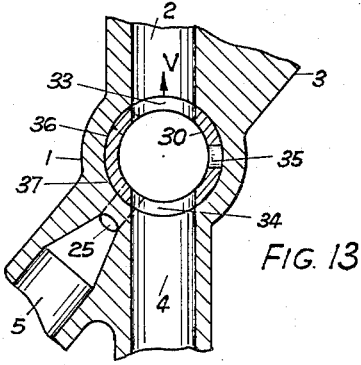

The bleeder tube assembly (see Figure 9) is connected by ring 67 to pipe 4 and by turning cock 30 to bring pointer 32 over mark 27 (see Figures 1 and 13) the end 57 of tube 56 may be passed through cock 30 right up into the wheel tube to its highest point. Meanwhile water is still passing into the wheel tube via passage 25, ports 37 and 33 and pipe 2. As the wheel tube fills with water all air escapes through holes 58, tube 57 and needle valve 60 to atmosphere, the needle valve 60 being adjusted to hold the desired pressure on gauge 6 (the apparatus may be left unattended in this state).

When a semi-rotary or plunger pump is supplying the water for filling, valve 7 may be closed to protect gauge 6. When the tire tube is full, or contains the required amount of water, the flow of water to the tube may be checked by withdrawing the end 57 of bleeder tube 56 into pipe 4 and turning cock 30 to bring pointer 32 over mark 28 (see Figures 1 and 14) whilst valve 7 is opened to get a pressure reading on gauge 6. With a water supply from gravity feed, pressure main or rotary pump, valve 7 may be safely left open during the whole of the filling operation. With the wheel tube full of water at the desired pressure, the end 57 of bleeder tube 56 is withdrawn into pipe 4, cock 30 is turned to the position shown in Figure 14, and the bleeder tube assembly disconnected. The valve assembly extractor (with the tube valve) is reconnected to pipe 4, cock 30 turned to the position shown in Figure 15 and the valve rescrewed into its seal in the tube valve stem. The water supply is preferably turned off and the apparatus disconnected from the wheel tube valve stem.

It will be understood that the filling process occupies approximately one quarter of an hour and takes much less time than the usual procedure does, that is, evacuating the tube then filling with water. Further it will be understood that in the case where a tube may be seventy-five per cent full of water and it is desired to fill it one hundred per cent with water, the use of the bleeder tube assembly obviates the need for completely evacuating the tube prior to filling it with water alone. The adapter (Figure 1) may be used as a pressure gauge to check tube pressures at will and is an efficient means of observing changes in pressure in wheel tubes due to working conditions and loading during experimental jobs.

I claim:

1. An improved adaptor, for use when filling the tube of a vehicle tire with water, comprising a plug cock body having four short pipes integral with it, two of said pipes being in line and respectively for attachment to the tube valve stem and for air outlet, the other two pipes being in line and at an angle of about 40° to the other pair and respectively for attachment to a gauge and to the water supply pipe; a hollow plug in said body provided with apertures which when the plug is in first position are out of register with all of said pipes and the adaptor is closed, at which stage a valve extractor assembly is connected to the said air outlet pipe, when the plug is turned to a second position the valve extractor stem is pushed through the apertures in the plug, the valve is removed and the said stem is returned into said air outlet tube, when said plug is turned again to the first position the valve extractor assembly is removed, when the plug is returned to second position a predetermined volume of air escapes from said tube, when the plug is turned to a third position water is admitted to said tube and a bleeder tube assembly is attached to the air outlet pipe, and when the plug is turned to fourth position the end of the bleeder tube is passed through said plug to the highest level of the said tube while water is still being admitted thereto and air from said tube is leaving by means of a needle valve in the bleeder tube assembly.

2. An adaptor as claimed in claim 1 wherein a needle valve is mounted in the duct from the valve stem pipe to the gauge pipe for shutting off said gauge at will.

3. An adaptor as claimed in claim 1 wherein the said plug has a pointer moving across a marked disc on the said body for indicating the respective operative positions of the apertures of said plug in relation to said pipes.

4. An improved adaptor, for use when filling the tube of a vehicle tire with water, comprising a plug cock body having four short pipes, two of said pipes being in line and respectively for attachment to the tube valve stem and for air outlet, the two additional pipes being respectively attached to a gauge and to the water supply pipe; a hollow plug in said body provided with apertures which when the plug is in first position are out of register with all of said pipes and the adaptor is closed, at which stage a valve extractor assembly is connected to the said air outlet pipe, when the plug is turned to a second position the valve extractor stem is pushed through the apertures in the plug, the valve is removed and the said stem is returned into said air outlet tube, when said plug is turned again to the first position the valve extractor assembly is removed, when the plug is returned to second position a predetermined volume of air escapes from said tube, when the plug is turned to a third position water is admitted to said tube and a bleeder tube assembly is attached to the air outlet pipe, and when the plug is turned to fourth position the end of the bleeder tube is passed through said plug to the highest level of the said tube while water is still being admitted thereto and air from said tube is leaving by means of a needle valve in the bleeder tube assembly.

WILLIAM SULLIVAN.

REFERENCES CITED

The following references are of record in the file of this patent:

UNITED STATES PATENTS

| Number | Name | Date |
|---|---|---|
| 2,320,042 | McMahon | May 25, 1943 |
| 2,415,019 | McMahon | Jan. 28, 1947 |
| 2,434,991 | Crowley | Jan. 27, 1948 |